United States Patent [19]

Banerji

[11] Patent Number: 5,006,398

[45] Date of Patent: Apr. 9, 1991

[54] FOOD WRAP FILM

[75] Inventor: Roth Banerji, Aartselaar, Belgium

[73] Assignee: Exxon Chemical Patents Inc., Linden, N.J.

[21] Appl. No.: 324,833

[22] Filed: Mar. 17, 1989

[30] Foreign Application Priority Data

Mar. 18, 1988 [GB] United Kingdom ............... 8806504
Aug. 5, 1988 [GB] United Kingdom ............... 8818692

[51] Int. Cl.$^5$ ................. C08L 33/04; B32B 27/32
[52] U.S. Cl. ..................... 428/220; 428/516; 428/520; 428/522; 525/222
[58] Field of Search ............ 525/222; 428/220, 520, 428/522, 516

[56] References Cited

U.S. PATENT DOCUMENTS

| | | | |
|---|---|---|---|
| 3,932,563 | 1/1976 | Argurio et al. | 260/897 B |
| 4,222,913 | 9/1980 | Cooper | 525/222 |
| 4,311,808 | 1/1982 | Su | 525/222 |
| 4,425,268 | 1/1984 | Cooper | 524/110 |
| 4,430,457 | 2/1984 | Dobreski | 525/222 |
| 4,500,681 | 2/1985 | Shulman | 525/222 |
| 4,504,434 | 3/1985 | Cooper | 264/22 |
| 4,657,982 | 4/1987 | Breck | 525/240 |

FOREIGN PATENT DOCUMENTS

| | | |
|---|---|---|
| 011930 | 6/1980 | European Pat. Off. . |
| 065359 | 11/1982 | European Pat. Off. . |
| 066149 | 12/1982 | European Pat. Off. . |
| 080198 | 6/1983 | European Pat. Off. . |
| 092318 | 10/1983 | European Pat. Off. . |
| 2094235 | 9/1982 | United Kingdom . |
| 2123747 | 2/1984 | United Kingdom . |

*Primary Examiner*—James Seidleck
*Attorney, Agent, or Firm*—T. Dean Simmons

[57] ABSTRACT

The invention provides a food wrap film containing a layer of a composition containing:
from 20 to 50 wt % of LLDPE;
from 1 to 10 wt % of an elastomeric polymer;
from 40 to 79 wt % of a copolymer of ethylene and an ethylenically unsaturated ester;
 the weight percentages being calculated on the total polymer weight; and said film containing
a minor amount of additives to provide, in combination with polymer components, an antifogging and antiblocking effect such that the film is transparent and has a controlled amount of residual cling.

14 Claims, No Drawings

FOOD WRAP FILM

FIELD OF INVENTION

The invention relates to film with cling characteristics, for wrapping, for example fresh food. This material is referred to in the USA as a PVC food wrap replacement film. The film contains ethylene vinyl acetate (EVA) as a principal component. The film may be used for manual wrapping but may be especially suited for automated food wrapping. All percentages in this specification are by weight unless otherwise indicated.

BACKGROUND OF INVENTION

Fresh food is wrapped automatically on processing lines with cling wrap film. The procedure involves the pulling off at high speed of film from a supply roll intermittently, pushing a tray filled with food upward until is impacts against the film, stretching the film over the sides of the tray to the lower side thereof, heat sealing (without melting) the edges of the film, and allowing the film to be pulled taut by elastic contraction. In use the film must be transparent, puncture resistant and must snap-back when deformed. This procedure has been performed satisfactorily with PVC. However it has been difficult to formulate compositions based on olefinic polymers for making cling wrap film. Any such composition must not only possess characteristics suitable for processing in the manner described above, but also be approved for food law purposes. The characteristics which make a film suitable for such automated processing may be difficult to relate to specific physical parameters; a balance of measurable properties only gives a general indication of suitability. U.S. Pat. No. 4,657,982 describes a film useful for stretch wrap applications. Stretch wrap film is used for example for holding packages together on a pallet. Such film is applied stretched and the holding force is provided by the tendency of the film to return to its original size elastically. Such films hence require a different balance of properties from food wrap film of the kind to which the invention relates. Stretch wrap films have a high elongation of 150% or 200% or over and tear propagation, once tearing is initiated, is very fast. Hence Elmendorf tear resistance is often used to measure tear strength. Trouser tear strengths are low for stretch wrap film.

The film of U.S. Pat. No. 4,657,982 includes a high proportion of strength providing polyethylene (from 80 to 99%); a small proportion of a tackifying low molecular weight polybutylene; and a small proportion of a polybutylene having a number average molecular weight of from 1 700 to 10 000. Up to 30% of the polyethylene may be EVA. There is no disclosure of a high EVA blend containing more EVA than polyethylene.

The low molecular weight polybutylene has a tackifying effect without adding to the film strength or to elastic properties.

U.S. Pat. No. 4,425,268 discloses in Example 1 a stretch wrap blend of 30% of LLDPE, 68% of EVA (12% VA), 1% of a low molecular weight polyisobutylene (PIB) and 1% of glycerol mono-oleate (GMO). No elastomer component was added. The PIB is added to provide sufficient sealing force without heating. GMO probably acts as agents for facilitating release of the film from the roll. U.S. Pat. No. 4,504,434 describes a similar material also for stretch wrap applications.

EP 80198 uses homopolymer and copolymer with low molecular weight PIB to provide cling or tack. Vinyl acetate is mentioned as a possible comonomer. The film contains no elastomer component and has a high tensile strength.

EP 92318 discloses a broad range of compositions incorporating for example LLDPE (linear low density polyethylene) as a polyolefin plastic component; EVA as component of a plasticiser; an olefinic elastomer (polybutylene is mentioned); and a hydrocarbon oil. EP 92318 does not disclose the specific combination of LLDPE, EVA and PIB and the incorporation of at least 1% of the hydrocarbon oil is required. The exemplified films are fairly stiff and highly elastic (the 1% secant modulus is generally above 25 000 psi).

A variety of blends have been proposed to meet specific food wrap requirements. However these blends have not replaced PVC substantially for automated processing lines as far as Applicants aware. The following documents discussed show clearly the range of proposed solutions.

U.S. Pat. No. 3,932,563 describes a material containing over 90% of EVA and uses low molecular weight PIB and no LLDPE. EP 11930 is similar.

EP 66149 uses a mixture of high pressure LDPE and low pressure LDPE and a cling agent such as glycerol oleate. There is no EVA or elastomer component present. The material will have low stretchability and will be prone tearing on high speed automatic processing lines. EP 65359 is similar.

GB 2123747 suggest the use of two different layers in the film one being an LLDPE-EVA blend, the other being a high EVA-ionomer resin blend.

GB 2094235 discloses a packaging film (which is probably a stretch wrap) containing a high amount of EVA (over 90%) and an ethylene propylene copolymer for frozen food packaging.

U.S. Pat. No. 4,500,681 discloses a blend containing a polypropylene olefin component, EVA and from 20 to 60% of an isobutylene—backbone elastomer component. The high isobutylene component content and the polypropylene would yield a material unsuited as a highly transparent cling film.

It is the object of the invention to provide cling film suitable for food wrapping which has a low yield strength, a low 1% secant modulus, a high impact resistance and high puncture resistance.

It is also an object of the invention to provide a cling wrap film suited for automatic processing to be used as a substitute for PVC.

SUMMARY OF THE INVENTION

The invention provides a food wrap film containing a layer of a composition containing:
from 20 to 50 wt % of LLDPE;
from 1 to 10 wt % of an elastomeric polymer;
from 40 to 79 wt % of a copolymer of ethylene and an ethylenically unsaturated ester;
the weight percentages being calculated on the total polymer weight; and said film containing
a minor amount of additives to provide, in combination with polymer components, an antifogging and antiblocking effect such that the film is transparent and has a controlled amount of residual cling.

Suitably the film has a thickness of from 10 to 30 microns a 1% secant modulus not exceeding 500 MPa, preferably 300 MPa and/or a tensile strength at break not exceeding 75 MPa, preferably less than 50 MPa. Advantageously the film has haze percentage of from 0.1 to 5; and a snap-back of from 20 to 70% recovery after elongation by 100%.

It is possible to formulate blend compositions for films containing ingredients such that current European food law requirements are met.

Suitably the LLDPE is present at from 25 to 40%; the MI is from 0.4 to 4, preferably from 0.5 to 0.8, and the density is from 0.90 to 0.93.

The LLDPE is preferably a polymer containing up to 10% of comonomer derived units to give a density of from 0.915 to 0.925. The comonomer derived units may be obtained from a $C_4$ to $C_8$ alpha-olefine, preferably $C_8$. Using less than 20% of LLDPE, the material has insufficient strength. Using more than 50% the stretchability will suffer and insufficient EVA can be incorporated to provide the desired cling properties.

Preferably the elastomeric polymer is a polymer containing at least partly units derived from isobutylene, preferably polyisobutylene homopolymer, VLDPE, or an ethylene-propylene rubber with suitable rheological properties and compatible to provide a low haze blend. Advantageously the elastomer is an olefin polymer of a higher olefin monomer from C4 to C13 and preferably polyisobutylene or polybutylene, said olefin polymer preferably having a Mv (Viscosity average molecular weight) 30 000 to 80 000. The elastomeric component should be used in amounts which do not give rise to compatibility problems; for this reason no more than 10, preferably 7%, is used. When polyisobutylene is used a PIB having an Mv of less than 30 000 will not impart sufficient strength and elasticity. Rather it may exude to the surface and provide an oily surface. An Mv greater than 80 000 may give rise to compatibility problems.

Suitably the ethylenically unsaturated ester is vinyl acetate (VA) and the copolymer contains from 5 to 15% of VA, preferably from 8 to 14% VA and optionally more than 10% VA; the MI is from 0.3 to 7 and preferably from 0.5 to 5 and especially from 2 to 4. The ethylene vinyl acetate (EVA) may form substantially the balance of polymer component. In combination with LLDPE and PIB or VLDPE or EP it contributes to a homogeneous, compatibilised mixture with good properties for a cling film.

In selecting additives for antiblocking and antifogging effects, one should take into account that the products are of low molecular weight and should have a sufficient compatibility to avoid undesired side-effects. The low molecular weight may lead desirably to a degree of added plasticity. Excessive amounts of agents having antiblocking effects should not be used as these materials may give an oil-like feel. The tackiness provided by the EVA and elastomer should only be reduced to the extent necessary to allow a thin film to be pulled off at high speed from a supply roll on an automatic processing line without undue difficulty.

The film should, particularly in its surface areas, be substantially devoid of hydrocarbon oils (i.e. paraffinic or naphthenic oils) and waxes. Desirably amounts greater than 1% of such materials are to be avoided.

Suitably the film has, coextruded with a first polymeric composition as defined above, a second layer of a polymer or polymer compositions having a higher crystallinity for improved film behaviour under automatic processing conditions, the additives, for antiblocking and antifogging effects being provided at least in said second layers. The layer of the invention may be a middle layer in a 3-layer structure for example or may form a pair of outer layers in a 3-layer structure.

In selecting the polymer to be used on the optional coextruded outerlayers, regard should be had to stretchability and tear strength as well as the added crystallinity which is desirable. The additives may be formulated to be incorporated principally in such outer layers which may have a thickness of from 2 to 10 microns each.

In one possible form of the invention the film consists of single layer as described previously. The preferred form of the invention however is the film obtained by coextruding a layer of the invention with one or more other layers. Suitably such other layer(s) are of an EVA/LLDPE/LDPE blend or EVA/VLDPE/LDPE, formulated to provide low haze, good dispersion of the blend components, and good melt flow characteristics. Conveniently such layer contains from 20 to 50% of LLDPE; from 4 to 16% of LDPE and a balance of EVA. Preferably the EVA and/or the LLDPE have the preferred characteristics set out previously in the context of the polybutylene containing film and such film. The LDPE component has preferably an MI of from 4 to 16 and a density of from 0.910 to 0.930.

By appropriate combination of coextruded layers a product with low haze and unexpectedly high puncture resistance can be obtained. By suitable selection of the components and appropriate proportions of such components a film is obtained similar in properties to PVC cling film. Transparency and snap-back are obtained side by side. Whilst the invention involves many components and does not have a strong tackifying additive, all components can be selected so that the necessary clinging properties are provided, together with the desirable mechanical properties for cling film, such as stretch and snap-back to permit automatic processing.

EXAMPLE 1

In a twin extruder there was blended compound A:
65% EVA (MI 2.5, 8.5% VA);
28.7% of LLDPE (MI 0.5, density 0.9180);
5% polyisobutylene (Vistanex Registered Trade Mark, Mw 42 600-46 100);
1% glycerine-mono-oleate (GMO); and
0.3% of castor oil and formed into pellets. The pellets were extruded on a blown extrusion machine at from 180°-200° C. at a blow up ratio of between 2 and 5. The blown film was wound up and tested. The properties below are graded against plasticised PVC film.

TABLE 1

|  | Plasticised PVC film (micron) | Prepared as described |
| --- | --- | --- |
| Thickness | 16–17 micron | 15–19 micron |
| Strength | +++ | ++ |
| Clarity/Gloss | +++ | +++ |
| Sealing | ++ | ++ |
| Snap-back | +++ | ++ |

The film of the invention has a combination of properties approximating that of PVC film. The properties are listed under A in Table 2.

Similarly there were blended compound C:
65% EVA
28.7% LLDPE
5% EP rubber (Vistalon V805 PE)
1% GMO
0.3% castor oil.

Its properties are listed under C in Table 2.
Also compound D:
65% EVA
28.7% LLDPE
5% TAFMER (Registered Trade Mark; a propylene & olefin VLDPE copolymer)
1% GMO
0.3% castor oil.
Its properties are listed under D in Table 2.
E in Table 2 shows the properties of a compound containing 33.7% of LLDPE and no elastomer component. During automatic processing, the film broke frequently.

EXAMPLE 2

Layers A-B-A were coextruded by casting onto a polished glossy chilled roll and drawn in a machine direction to an extent such that thickness became 16 micron ±1 micron with each layer constituting one third of the thickness. Each layer thus had a thickness of approximately 5 micron.

Layers A were of the pelleted material set out in Example 1. Layer B contained a homogeneous mixture of:
55% EVA (MI 2.5, 9% VA);
35% LLDPE (MI 0.5, density 0.9180);
8% LDPE (MI 8, density 0.915);
0.9% GMO;
0.9% castor oil;
0.1% anti-oxidant.

For comparative purposes a plasticised PVC food wrap film composed of 100 parts PVC, 20 parts dioctyladipate, 3 parts of Zn-stearate oxidation stabiliser and 10 parts epoxidised soya-oil was used. The resulting properties are summarised below. The properties of PVC are shown also to illustrate how A-B-A approximates PVC food wrap film in many respects.

TABLE 2

| Film properties | | PVC | B only | A-B-A | A only | C | D | E comparat. |
|---|---|---|---|---|---|---|---|---|
| Thickness in | | 16 | 16 | 15 | 15 | 18 | 8 | 18 |
| Haze in % | | 0.9 | 0.3 | 0.8 | 1.05 | | | |
| Tensile strength | MD | 30.14 | 42.81 | 41.33 | 47.76 | 35 | 40 | 35.0 |
| in MPa at break | TD | 37.1 | 23.11 | 17.14 | 14.36 | 28 | 30 | 27.0 |
| Tensile strength | MD | Nihil | Nihil | Nihil | Nihil | Nihil | Nihil | Nihil |
| in MPa at yield | TD | Nihil | 6.2 | 6.8 | 5.7 | 5.0 | 8.0 | 6.0 |
| Elongation in | MD | 275 | 245 | 175 | 210 | 530 | 580 | 520 |
| at break | TD | 405 | 745 | 670 | 720 | 680 | 670 | 650 |
| 1% Sec. Modul. | MD | 64.43 | 129 | 170 | 163 | 110 | 105 | 130 |
| in MPa | TD | 63.39 | 167 | 245 | 183 | 132 | 110 | 150 |
| Dart drop in g | | 290 | 50 | 50 | 50 | — | — | — |
| Impact resistance (g) F50 | | — | — | — | — | 90 | 145 | 80 |
| Trouser tear in g/micron | TD | 1.1 | 17.5 | 21 | 18.6 | 17.0 | 14.0 | 16.0 |
| Puncture in mJ/micron | | 22.3 | 9.9 | 15.5 | 11.6 | 7.0 | 7.5 | 6.0 |
| Oxygen transmission rate cc/m2/day | | >20000 | >20000 | >20000 | >20000 | | | |
| Water vapour transmission rate gr/m2/day | | 29 | 76 | 75 | 74 | | | |
| Snap-back Test Loss of power (%) | | | | | | | | |
| after 1 min. | | 63 | 33 | 35 | 40 | | | |
| after 2 min. | | 65 | 35 | 38 | 42 | | | |

Other coextruded configurations of A and B are also possible.

That which is claimed is:

1. A transparent food wrap cling film comprising a layer of a composition containing:
   from 20 to 50 wt % of LLDPE;
   from 1 to 10 wt % of an elastomeric polymer;
   from 40 to 79 wt % of a copolymer of ethylene and a vinyl acetate comprising 5 to 15 percent of VA;
   the weight percentages being calculated in the total polymer weight;
   and said film containing a minor amount of additives to provide, in combination with polymer components, an antifogging and antiblocking effect such that the film is transparent and has a controlled amount of residual cling.

2. A film according to claim 1 having a thickness of from 10 to 30 microns, a 1% secant modulus not exceeding 500 MPa and a tensile strength at break not exceeding 75 MPa.

3. A film according to claim 2 having a haze percentage of from 0.1 to 5;
   an elongation of from 400 to 700%; and
   a snap-back of from 20 to 70 recovery after elongation by 100%.

4. A film according to claim 3 in which the elastomeric polymer comprises at least one polymer selected from the group consisting of a polymer containing isobutylene derived units, VLDPE and an ethylene-propylene rubber selected so that the elastomeric polymer has suitable rheological properties to provide a low haze blend.

5. A film according to claim 4 which further comprises one or more other layers coextruded with said a layer wherein said one or more other layers comprise polymer compositions having a higher crystallinity for improved film behaviour under automatic processing, and additives for antiblocking and antifogging.

6. A film according to claim 5 in which the LLDPE is present at from 25 to 40%; the MI is from 0.4 to 4, and the density is from 0.90 to 0.93.

7. A film according to claim 6 in which the copolymer contains from 8 to 14% VA and the film has a MI from 0.5 to 5.

8. A film according to claim 3 in which the elastomeric polymer is an olefin polymer of a higher olefin monomer from C4 to C13 said olefin polymer having a Mv of from 30 000 to 80 000.

9. A film according to claim 8 wherein the additives are comprised of glycerine mono-oleate in an amount of from 0.5 to 3% and castor oil in an amount of from 0.5 to 1.5%.

10. A film according to claim 5 wherein said one or more other layers comprise at least one compound selected from the group consisting of EVA, LLDPE, LDPE, VLDPE and blends thereof.

11. A film according to claim 1 in which the LLDPE is present at from 25 to 40%, the MI is from 0.4 to 4 and the density is from 0.90 to 0.93.

12. A film according to claim 1 in which the copolymer has a MI from 0.3 to 7.

13. A film according to claim 9 which is made by casting.

14. A transparent cling wrap film containing a layer comprised of 40 to 79% comprising 5-15% VA 1 to 10% butylene polymer wherein the Mv of the butylene polymer is from 30,000 to 80,000; 20 to 50% of LLDPE; and cling preserving, antifogging and antiblocking agents.

* * * * *